UNITED STATES PATENT OFFICE.

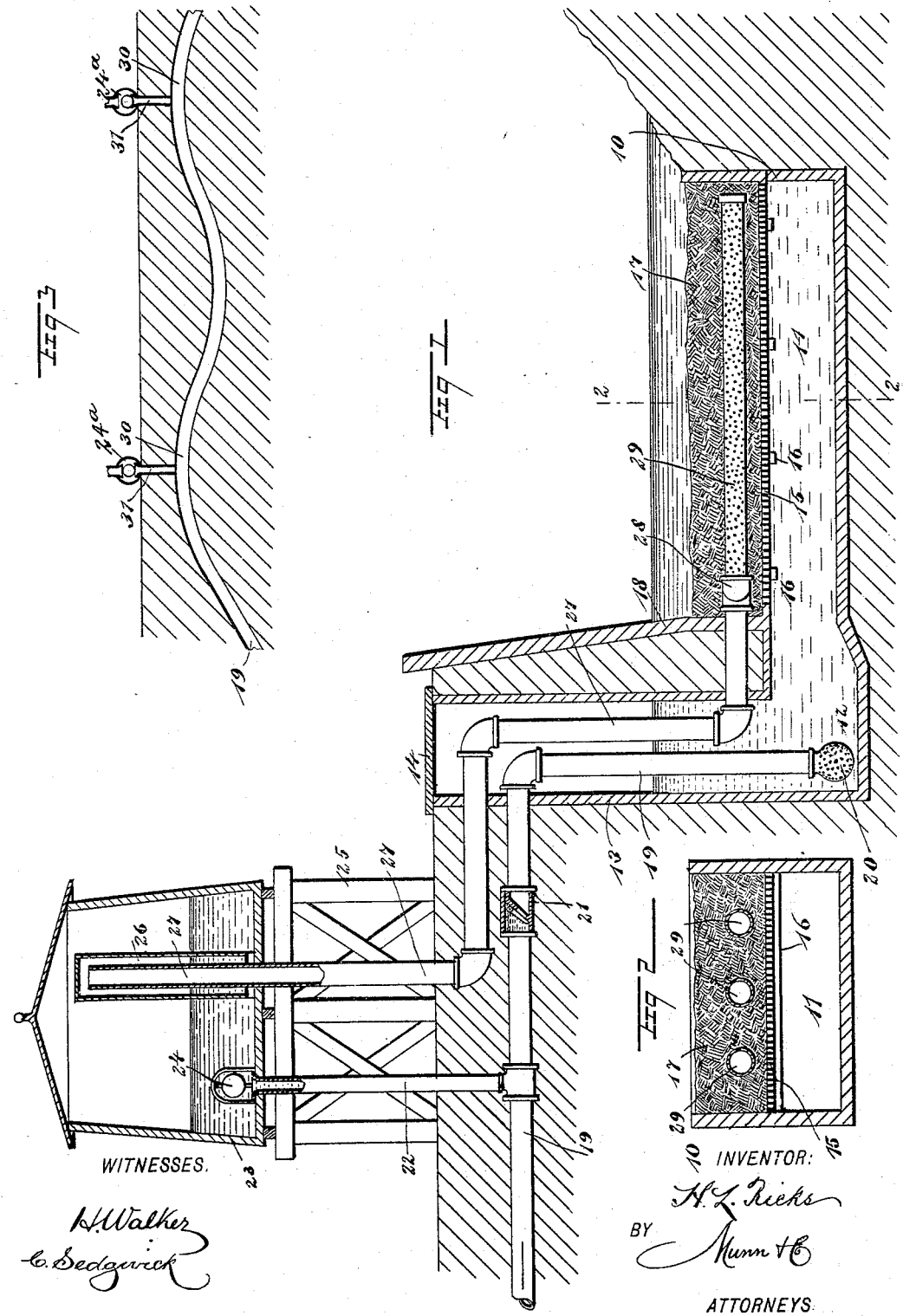

HIRAM L. RICKS, OF EUREKA, CALIFORNIA.

INTAKE AND FILTER.

SPECIFICATION forming part of Letters Patent No. 553,424, dated January 21, 1896.

Application filed March 17, 1893. Serial No. 466,463. (No model.)

*To all whom it may concern:*

Be it known that I, HIRAM L. RICKS, of Eureka, in the county of Humboldt and State of California, have invented a new and Improved Intake and Filter, of which the following is a full, clear, and exact description.

My invention relates to improvements in intakes and filters, and especially such as are adapted for use in public water systems, and the object of my invention is to produce a simple apparatus by means of which large quantities of water may be thoroughly filtered and also to provide means in connection therewith for cleansing the filtering material so that the impurities will be washed away.

To this end my invention consists in certain features of construction and combinations of parts, which will be hereinafter described and claimed.

Reference is to be had to the accompanying drawings, forming a part of this specification, in which similar figures of reference indicate corresponding parts in all the views.

Figure 1 is a detail sectional view showing the general arrangement of the entire apparatus. Fig. 2 is a cross-section through the intake and filter on the line 2 2 in Fig. 1; and Fig. 3 is a detail sectional view showing the manner in which the main discharge-pipe is freed of air.

The intake and filter is provided with a main casing 10, which is adapted to be arranged in the bottom of a stream, lake, or other source of water-supply, and which may be of any necessary size and of any suitable material. The casing is open at the top and is divided longitudinally and horizontally so as to form a lower water-basin 11, into which the water settles through the filtering compound above, as hereinafter described, and this basin at the shore end is provided with a depression 12, into which the main discharge-pipe descends. One end of the casing 10 terminates in a vertical well 13, in which the discharge and siphon pipes are arranged as described below, and the well extends to the surface of the ground and is covered by a removable cap 14.

The settling-basin 11 is separated from the upper portion of the case by slats 15, which are supported on the cleats 16 and between which the water percolates. This screen or open flooring formed of the slats and cleats supports the filtering material 17, which fills the upper portion of the casing 10 and through which the water passes into the settling-basin. The banking of the stream or lake is prevented from caving in by a suitable face-wall 18, which may be secured to the intake-casing.

The main discharge-pipe 19, which connects with a reservoir or with a pump and is adapted to supply the mains in the usual way, leads from the deeper portion 12 of the settling-basin 11, and terminates at its lower end in the usual strainer 20. The water-pipe passes up into the well 13, and from thence extends through the ground to its point of delivery in the usual manner. The pipe 19 is provided with a check-valve 21 of the common form, and beyond the check-valve is a branch pipe 22, which leads upward into a tank 23, the branch pipe having an ordinary ball-valve 24 at the point where it enters the tank, which valve operates as a check-valve, and prevents the water from flowing back. The tank is supported on a suitable framework 25, and may be arranged at any necessary height to give the right head to the flushing or cleansing pipes.

Arranged vertically within the tank is a casing 26 which is open at the bottom, and extending downward through this casing is a pipe 27, the upper end of the pipe being near the top of the casing, and this pipe 27 extends downward through the well 13 and through the side wall of the well, and terminates at its lower end in a T 28, which is arranged above the settling-basin 11, and this T connects with parallel perforated pipes 29, which are embedded in the filtering material, and which are closed at their free ends.

It will thus be seen that when the water is being discharged through the pipe 19 it will flow freely through the valve 21, but when the water is allowed to flow back through the pipe 19, it will be checked at the valve 21 and will pass upward through the pipe 22 into the tank 23. When the tank has become full or nearly so, the water will begin to flow out through the pipe 27, and will be discharged through the perforated pipes 29 with sufficient force to wash the impurities from the filtering material 17, and throw the said impurities upward into the water above where they will be dissipated or carried off by the current, and the filtering-bed may thus be easily kept clean and the filter in good working condition always.

Where the pipe 19 is connected directly with the pump, a tank may be arranged near the pumping-station and connected with the tank 23, so that the flushing arrangement for cleaning the filtering material may be operated without stopping the pumps.

In Fig. 3 I have shown the means of letting the air out of the pipe 19, which is as follows: Where the pipe extends for a considerable distance there are certain points, such as 30, which come comparatively near the surface, and in these higher parts the air collects. Consequently at these parts branch pipes 31 are located, which extend upward above the ground, and in these pipes are arranged ball-valves $24^a$ in casings A having seats $a$ and $b$. The air being pressed upward by the water will pass into the pipes 31 and lift the valves $24^a$ from their seats $b$ and pass out through the said pipes. As soon as all the air is expelled, the water rising in the pipes 31 will force the valve on the seats $a$ and thus prevent the water from escaping.

From the foregoing description it will be understood that this apparatus requires but little looking after, as it is not likely to get out of order; but if it is necessary to reach the interior of the casing 10 and well 13 it may be done by simply removing the cap 14.

Having thus described my invention, I claim as new and desire to secure by Letters Patent—

1. The combination, with the casing having a settling basin in the bottom and filtering material above it, of a discharge pipe leading from the settling basin and provided with a check valve, a tank supported at an elevation and connected with the discharge pipe, perforated pipes extending into the filtering material, and a pipe leading from the tank to the perforated pipes, substantially as described.

2. The combination, with the main casing having a settling basin in the bottom and filtering material above it, of a discharge pipe leading from the settling basin and having a check valve therein, a tank supported above the main casing, a branch pipe leading from the main discharge pipe to the tank and having a check valve at the top, an open bottomed casing mounted within the tank, a pipe leading from the casing to a point above the settling basin, and perforated pipes connected with the said pipe and extending into the filtering material, substantially as described.

3. A filter and intake, comprising a casing having a well at one end, and a settling chamber in its bottom, a filtering medium above the settling chamber, a valved discharge pipe leading from the well, a tank with which the discharge pipe is connected, a perforated pipe arranged in the filtering medium, and a siphon for conducting the water from the tank to the perforated pipe, substantially as described.

HIRAM L. RICKS.

Witnesses:
PETER BELCHER,
A. T. CRANE.